(No Model.) 2 Sheets—Sheet 2.

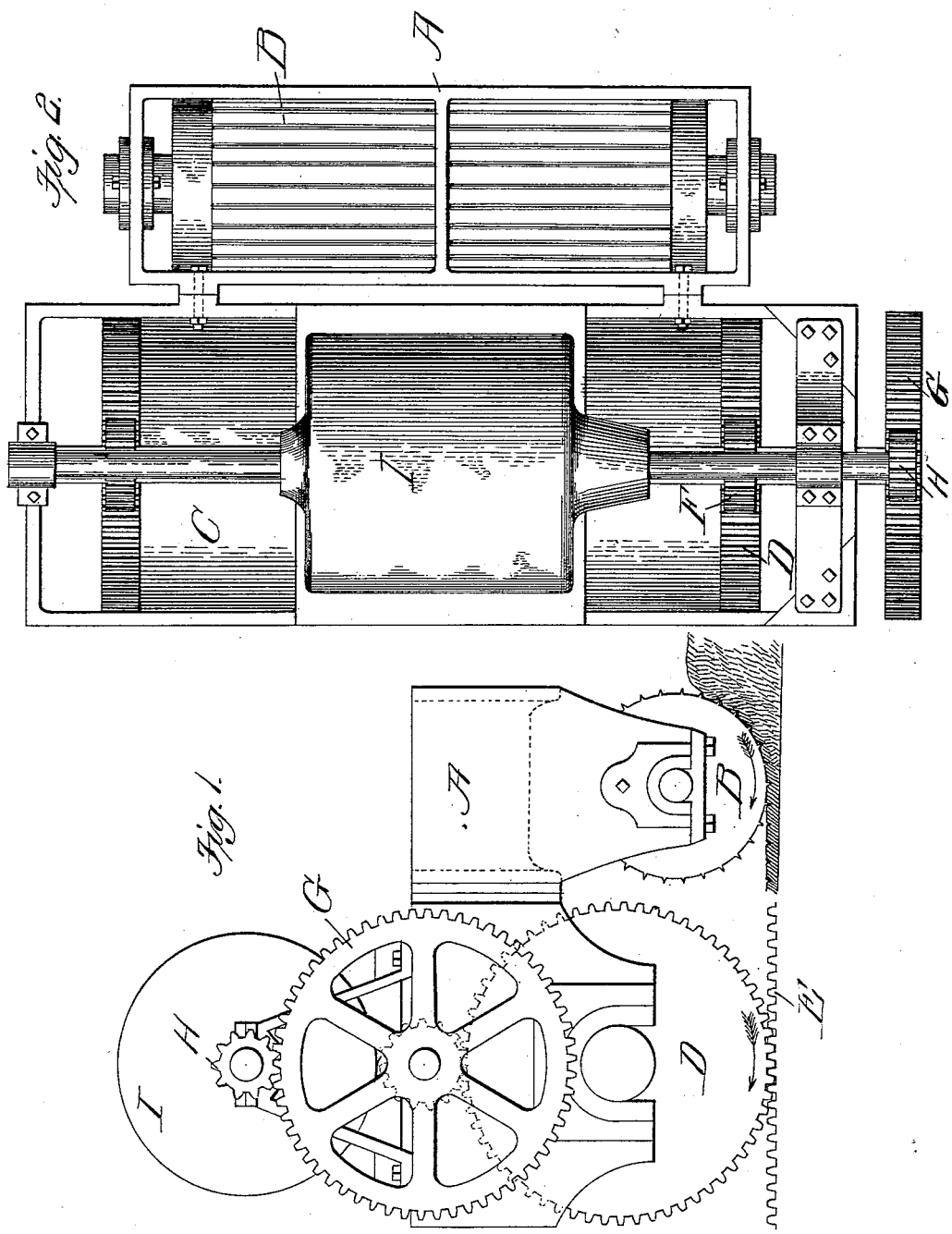

C. C. HARTUNG.
METHOD OF AND APPARATUS FOR ROLLING PLATE GLASS.

No. 602,447. Patented Apr. 19, 1898.

Witnesses:
G. A. Pennington
J. R. Cornwall

Inventor
Chas. C. Hartung
by Paul Bakewell
his atty.

UNITED STATES PATENT OFFICE.

CHARLES C. HARTUNG, OF ST. LOUIS, MISSOURI, ASSIGNOR TO EDWARD WALSH, JR., OF SAME PLACE.

METHOD OF AND APPARATUS FOR ROLLING PLATE-GLASS.

SPECIFICATION forming part of Letters Patent No. 602,447, dated April 19, 1898.

Application filed September 3, 1896. Serial No. 604,706. (No model.)

*To all whom it may concern:*

Be it known that I, CHARLES C. HARTUNG, a citizen of the United States, residing in the city of St. Louis, State of Missouri, have invented a certain new and useful Improvement in Methods of and Apparatus for Rolling Plate-Glass, of which the following is a full, clear, and exact description, reference being had to the accompanying drawings, forming a part of this specification, wherein—

Figure 3:
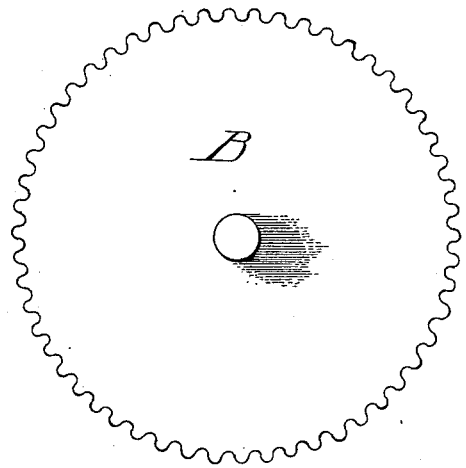
Figure 4:
Figure 5:
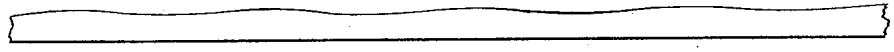

Figure 1 is a side elevational view of a machine embodying my invention. Fig. 2 is a top plan view of the same. Fig. 3 is a view illustrating a modified form of roller. Fig. 4 is a view showing a plate of glass in different stages of its manufacture as made by my improved method and apparatus. Fig. 5 illustrates a plate of glass as heretofore made, showing the imperfections on the surface of the same.

Heretofore in the manufacture of rolled plate-glass the machines most generally employed comprised a bed-plate or casting-table, which was either a smooth planished surface or a configured surface, and a roller or rollers which pressed the glass out on this table to make a sheet of rough-rolled glass of a certain thickness, determined by the size of the fillets which supported the roller. In some machines where two or more rollers were employed one of said rollers, known as the "following roller," was configured and the advance roller smooth. In this machine the table was generally smooth, and as the rollers traversed the table the front or smooth roller would initially roll the glass, and the following or configured roller in the wake of the smooth roller would impress a design or designs upon the upper surface of the plate. There have also been other machines in which smooth rollers alone were employed. In all of these machines the plate of glass would have an imperfect surface on one side, due, it is thought, to the contraction of the molten glass after it has been spread on the casting-table. These imperfections existed in the form of waves or undulations, which extended longitudinally the sheet, making the glass of varying thickness and rendering it less valuable than if such imperfections were not present. These imperfections are always present in glass known in the market as "cathedral," "rough plate," or "skylight" glass, and to my knowledge, although many attempts have been made to remove them or to prevent them during the course of manufacture of the glass, I am not aware that such has ever been successfully accomplished.

I have discovered that if a roll having elongated cross-ridges in its surface as distinguished from a smooth roller be employed to initially roll the glass into plate form, said plate being finished by the pressure of a smooth roller, the resultant article will be a plate of glass from which are absent the imperfections before referred to.

In my invention I employ a smooth following roller to assist in smoothing the surface of the glass after it has been rolled by an initial roller which has elongated cross-ridges on its periphery.

Briefly stated, therefore, my invention may be said to consist in the method herein described of making plate-glass, first, by forming the sheet of approximately the same thickness throughout its length, breaking up the upper surface of the sheet by forming indentations therein, which indentations run at right angles to the wavy lines of shrinkage, said indentations being formed while the sheet is spread, permitting said indented upper surface to remain undisturbed for a short period, during which the molten glass flows, endeavoring to close said indentations, and finally smoothing said upper surface to entirely obliterate said indentations.

My invention also consists in the apparatus for carrying my improved method into effect, and in this I employ an advance roller having a longitudinally-corrugated surface for initially rolling the glass into plate form and a finishing-roller having a smooth surface following in the wake of the advance roller, said rollers both traveling in a plane parallel to the plane of the bed on which the molten glass is spread to form the sheets.

In the drawings I have illustrated an apparatus for carrying my invention into effect, which apparatus I have found to answer the purpose admirably; but it is obvious that there are other forms of apparatus which could as advantageously be used without in the least departing from the nature and principle of my invention. I have shown this "power-carriage," as I term it, as a simple, compact, and effective device and as well adapted for use in connection with my invention as any carriage now extant with which I am familiar; but I do not wish to be understood as limiting myself to the apparatus shown in detail in the drawings, for the reasons above given.

In the drawings, A indicates a suitable frame, in the front end of which is mounted the advance or initial roller B. This roller B has a roughened surface, which is formed by longitudinally corrugating the same, said corrugations being preferably of the shape shown in Figs. 1 and 3; but there are other forms of corrugations which could as well be used.

C indicates the smooth finishing-roller, mounted in the frame A behind the corrugated roller B. This finishing-roller C has conjoined to it gear-wheels D, which are adapted to mesh with the cog-rack E, arranged at the sides of the casting-table. Meshing with gears D are pinions F, which are mounted on a shaft common to a gear G, which latter gear is driven by a pinion H on the armature-shaft of a motor I. Suitable controlling devices for the motor are employed for controlling its direction of travel, speed, &c.

The operation of the device is as follows: The molten glass being placed upon the table in front of roller B and the carriage started, said roller will spread the molten glass over the table, forming in this spreading operation the converse of the corrugations or roughened surface of the roller. The plate of glass thus formed has a series of transversely-disposed grooves or ridges in its surface, and when the smooth finishing-roller exerts a pressure on the sheets it will assist the molten glass to form its surface—that is, the plate of glass under this final pressure will have its surface acted upon in such manner that the converse of the pattern of the inital roller is obliterated. The resultant product is a plate of glass having a smooth surface with little or no trace of the waves or irregularities or wave-like imperfections present in plates of glass of this character heretofore made.

Having thus described my invention, what I claim, and desire to secure by Letters Patent of the United States, is—

1. The herein-described method of making plate-glass, which consists, first, in forming the sheet of approximately the same thickness throughout its length, breaking up the upper surface of the sheet by forming indentations therein, which indentations run at right angles to the wavy lines of shrinkage, said indentations being formed while the sheet is being spread, permitting said indented upper surface to remain undisturbed for a short period, during which the molten glass flows, endeavoring to close said indentations, and finally smoothing said upper surface to entirely obliterate said indentations; substantially as described.

2. In an apparatus for rolling plate-glass, the combination with a table or bed having cog-racks arranged along its sides, of a carriage having a longitudinally-corrugated advance roller for initially spreading the molten glass into plate form, of approximately the same thickness throughout the length of the sheet of glass, a smooth following roller in said carriage having gear-wheels arranged at its ends for coöperating with the racks, said rollers moving in a plane parallel to the plane of the surface of the table; substantially as described.

In testimony whereof I hereunto affix my signature, in presence of two witnesses, this 20th day of August, 1896.

CHARLES C. HARTUNG.

Witnesses:
F. R. CORNWALL,
G. A. PENNINGTON.